United States Patent
Meier et al.

(10) Patent No.: US 11,054,352 B2
(45) Date of Patent: Jul. 6, 2021

(54) METHOD OF TESTING ADDITIVE MANUFACTURED MATERIAL AND ADDITIVE MANUFACTURED PARTS

(71) Applicant: The Boeing Company, Chicago, IL (US)

(72) Inventors: Stefanie Anita Meier, Seattle, WA (US); Rogie I. Rodriguez, Huntsville, AL (US); Chul Young Park, Snohomish, WA (US); Troy Allan Haworth, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 232 days.

(21) Appl. No.: 16/413,752

(22) Filed: May 16, 2019

(65) Prior Publication Data
US 2020/0363303 A1 Nov. 19, 2020

(51) Int. Cl.
| | |
|---|---|
| *G01N 3/02* | (2006.01) |
| *G01N 3/08* | (2006.01) |
| G01N 3/04 | (2006.01) |
| B33Y 10/00 | (2015.01) |
| B33Y 50/02 | (2015.01) |

(Continued)

(52) U.S. Cl.
CPC .............. *G01N 3/08* (2013.01); *G01N 3/02* (2013.01); *B22F 10/20* (2021.01); *B22F 10/30* (2021.01); *B33Y 10/00* (2014.12); *B33Y 50/02* (2014.12); *G01N 2203/0017* (2013.01); *G01N 2203/0252* (2013.01); *G01N 2203/0286* (2013.01);

(Continued)

(58) Field of Classification Search
CPC .......... B22F 10/20; B22F 10/30; B33Y 10/00; B33Y 50/02; G01N 2203/0017; G01N 2203/0218; G01N 2203/0252; G01N 2203/0286; G01N 2203/0298; G01N 2203/0682; G01N 3/08; G01N 3/04; G01N 3/02; G01N 3/32; G01N 3/24; G01N 3/36; G01N 3/38

See application file for complete search history.

(56) References Cited

U.S. PATENT DOCUMENTS

| | | |
|---|---|---|
| 3,757,568 A | 9/1973 | Fletcher et al. |
| 4,080,824 A | 3/1978 | Starks |

(Continued)

FOREIGN PATENT DOCUMENTS

| | | |
|---|---|---|
| CN | 101949797 B | 5/2012 |
| WO | 2017220567 A1 | 12/2017 |

OTHER PUBLICATIONS

Reddy, A., et al., "Small Scale Mechanical Testing for Additively Manufactured (Direct Metal Laser Sintered) Monolithic and Hybrid Test Samples", Procedia Structural Integrity 14, 2nd International Conference on Structural Integrity and Exhibition 2018, Jan. 1, 2019, pp. 449-466, vol. 14, Elsevier B.V.

(Continued)

*Primary Examiner* — Jonathan M Dunlap
(74) *Attorney, Agent, or Firm* — Coats & Bennett, PLLC

(57) ABSTRACT

Methods of using micro-specimens for testing an additive manufactured material or a part made from the additive manufactured material. The methods include testing small and large test specimens taken from an additive manufactured part and from a blank constructed from the additive manufactured material. Correction factors based on the test specimens are calculated and applied to a calculated material property of the additive manufactured material.

20 Claims, 4 Drawing Sheets

(51) Int. Cl.
  *B22F 10/20* (2021.01)
  *B22F 10/30* (2021.01)
(52) U.S. Cl.
  CPC ............... *G01N 2203/0298* (2013.01); *G01N 2203/0682* (2013.01)

(56) References Cited

U.S. PATENT DOCUMENTS

| | | |
|---|---|---|
| 4,213,331 A | 7/1980 | Porter |
| 4,916,954 A | 4/1990 | Buzzard |
| 5,313,841 A | 5/1994 | Layher |
| 5,741,976 A | 4/1998 | Schinke et al. |
| 6,216,531 B1 | 4/2001 | Zhou |
| 6,983,658 B2 | 1/2006 | Wenski |
| 2002/0162400 A1 | 11/2002 | Xie et al. |
| 2008/0309360 A1 | 12/2008 | Hall |
| 2011/0041624 A1 | 2/2011 | Barnes et al. |
| 2012/0210801 A1 | 8/2012 | Pettit |
| 2014/0123773 A1 | 5/2014 | Lemmer et al. |
| 2015/0338325 A1 | 11/2015 | Kismarton |
| 2020/0124510 A1 | 4/2020 | Ma et al. |
| 2020/0309656 A1 | 10/2020 | Achten et al. |

OTHER PUBLICATIONS

EP Search Report dated Oct. 21, 2020 in re EP Application No. 20172054.7.

Bergueeva, A.V., et al., "Gage length and sample size effect on measured properties during tensile testing", Materials Science & Engineering A, 2009, pp. 79-83, vol. 526.

Kumar, K., et al., "Optimisation of thickness of miniature tensile specimens for evaluation of mechanical properties", Materials Science & Engineering A, 2016, pp. 32-43, vol. 675.

Lucas, G.E., "Review of Small Specimen Test Techniques for Irradiation Testing", Metallurgical and Materials Transaction A, May 1, 1990, pp. 1105-1119, vol. 21A.

ASTM International, "Small Specimen Test Techniques: 6th Volume", Selected Technical Papers, Jan. 1, 2015, pp. 1-260, vol. 6.

ASTM International, "Effects of Radiation on Materials", Proceedings of the Tenth International Symposium, Jan. 1, 1981, pp. 1-765.

Jung, P., et al., "Recommendation of miniaturized techniques for mechanical testing of fusion materials in an intense neutron source", Journal of Nuclear Materials, Feb. 21, 1996, pp. 186-205, vol. 232.

ASTM International, "Standard Test Methods for Tension Testing of Metallic Materials", American Association State Highway and Transportation Officials Standard, Aug. 1, 2016, pp. 1-30.

ASTM International, "Effects of Radiation on Materials", Twelfth International Symposium, Nov. 1, 1985, pp. 1-533, vol. 1.

METHOD OF TESTING ADDITIVE MANUFACTURED MATERIAL AND ADDITIVE MANUFACTURED PARTS

TECHNOLOGICAL FIELD

The present disclosure generally relates to method of testing additive manufactured material and additive manufactured parts and, more specifically, to the use of micro-specimens to test the additive manufactured material and additive manufactured parts.

BACKGROUND

Testing is used to determine the mechanical performance of a manufactured part. The testing includes determining one or more properties of the material. The part can be designed for a wide variety of uses, such as but not limited to a part on an aircraft or other vehicle, machinery, tools, and household products.

Parts produced using traditional material forms such as plate, extrusion, and forging, can be tested using standard size test specimens or coupons. When used to determine the manufacturing quality, these are referred to as witness test specimens. These standard size test coupons are fabricated from other material in the same heat lot as the parts and using standard size test specimens. Because the materials have uniform properties, the witness test specimens are effective for testing to indirectly determine the lot quality.

Additive manufactured parts are produced using an additive manufacturing process. In additive manufacturing, parts are built using a material joined or solidified by an additive process that is controlled by a computer and 3D model data. Using standard size test specimens to determine material properties of an additive manufactured part is difficult. Standard size test specimens are often too large to be used to test mechanical properties at discrete locations in the additive manufactured parts. Witness test specimens may not be effective because local variation within a build may cause differences across the additive manufactured material. These differences can occur even though the parts were manufactured in the same additive manufactured build as the test specimens.

An alternative means to verify the mechanical performance of a part is by testing a full-scale version of the part. However, full-scale part testing is not economical for many part designs.

SUMMARY

One aspect is directed to a method of analyzing a part design. The method includes: extracting one or more coupons and micro-coupons from one or more blanks of additive manufactured material made by an additive manufacturing process with the coupons being larger than the micro-coupons. The method includes testing the one or more coupons and micro-coupons from the one or more blanks and calculating a first correction factor based on a ratio of test results of the one or more micro-coupons from the one or more blanks relative to test results of the one or more coupons from the one or more blanks. The method includes using the additive manufacturing process and making a part from the additive manufactured material according to the part design. The method includes extracting one or more micro-coupons from the part. The method includes testing the one or more micro-coupons from the part and calculating a second correction factor based on a ratio of test results of the one or more micro-coupons from the part relative to the test results of the one or more micro-coupons from the one or more blanks. The method includes calculating a statistically-derived material property of the additive manufactured material by testing the one or more coupons from the one or more blanks. The method includes calculating a capability value of the additive manufactured material by applying the first correction factor and the second correction factor to the statistically-derived material property of the additive manufactured material.

In another aspect, the method includes using the capability value and calculating a performance of parts to be made according to the part design from the additive manufactured material.

In another aspect, calculating the first correction factor includes dividing the test results of the one or more micro-coupons from the one or more blanks by the test results of the one or more coupons from the one or more blanks.

In another aspect, calculating the second correction factor comprises dividing the test results of the one or more micro-coupons from the part by the test results of the one or more micro-coupons from the one or more blanks.

In another aspect, calculating the capability value of the additive manufactured material includes multiplying the statistically-derived material property of the additive manufactured material by the first correction factor and the second correction factor.

In another aspect, extracting the one or more micro-coupons from the part includes excising a blank from the part and extracting the one or more micro-coupons from the blank.

In another aspect, the one or more micro-coupons from the one or more blanks and the one or more micro-coupons from the part include identical geometric dimensions.

One aspect is directed to a method of analyzing a part design. The method includes extracting one or more coupons and micro-coupons from one or more coupon blanks made from an additive manufactured material by an additive manufacturing process. The method includes extracting one or more micro-coupon-parts from an additive manufactured part made by the additive manufacturing process using the part design. The method includes testing a material property and obtaining test results for each of the one or more coupons, the micro-coupons, and the micro-coupon-parts. The method includes calculating a first correction factor based on the test results of the one or more micro-coupons relative to the test results of the one or more coupons. The method includes calculating a statistically-derived material property of the additive manufactured material based on the test results of the one or more coupons. The method includes calculating a second correction factor based on the test results of the one or more micro-coupon-parts relative to the test results of the one or more micro-coupons. The method includes calculating a capability value of the additive manufactured material based on the first correction factor and the second correction factor applied to the statistically-derived material property. The method includes using the capability value and calculating a performance of parts to be made according to the part design from the additive manufactured material.

In another aspect, the method includes the one or more coupons being larger than both of the one or more micro-coupons and the one or more micro-coupon-parts.

In another aspect, the one or more micro-coupons and the one or more micro-coupon-parts include identical geometric dimensions.

In another aspect, the method includes calculating a margin of safety of parts to be made according to the part design from the additive manufactured material with the margin of safety being calculated based on the capability value of the additive manufactured material.

In another aspect, calculating the performance of parts to be made according to the part design from the additive manufactured material includes analyzing a computer model of the part design with loading conditions using the capability value of the additive manufactured material.

In another aspect, calculating the first correction factor includes dividing the test results of the one or more micro-coupons by the test results of the one or more coupons.

In another aspect, calculating the second correction factor includes dividing the test results of the one or more micro-coupon-parts by the test results of the one or more micro-coupons.

In another aspect, calculating the capability value of the additive manufactured material includes multiplying the statistically-derived material property by the first correction factor and the second correction factor.

In another aspect, the method includes extracting the one or more micro-coupon-parts from a selected location on the additive manufactured part.

In another aspect, extracting the one or more micro-coupon-parts from the additive manufactured part includes excising a blank from the additive manufactured part, and extracting the one or more micro-coupon-parts from the blank.

One aspect is directed to a method of analyzing a part design. The method includes extracting one or more micro-coupons and coupons from a blank with the blank manufactured through an additive manufacturing process that uses an additive manufactured material and with the one or more coupons being larger than the one or more micro-coupons. The method includes testing the one or more micro-coupons and the one or more coupons and obtaining micro-coupon test results and coupon test results, respectively. The method includes calculating a first correction factor by dividing the micro-coupon test results by the coupon test results. The method includes calculating a statistically-derived material property based on the coupon test results. The method includes creating a part that is made using the additive manufacturing process using the additive manufactured material according to the part design. The method includes extracting one or more micro-coupon-parts from the part. The method includes testing the one or more micro-coupon-parts and obtaining micro-coupon-parts test results. The method includes calculating a second correction factor by dividing the micro-coupon-parts test results by the micro-coupon test results. The method includes calculating a capability value of the part by multiplying the first correction factor and the second correction factor by the statistically-derived material property. The method includes calculating a performance of modeled parts to be made using the additive manufacturing process using the additive manufactured material.

In another aspect, the one or more coupons are larger than both the one or more micro-coupons and the one or more micro-coupon-parts.

In another aspect, the one or more micro-coupons and the one or more micro-coupon-parts include identical geometric dimensions.

DETAILED DESCRIPTION

Figure 1:
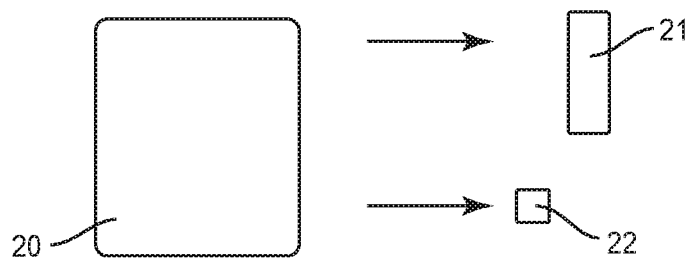
FIG. 1 is a schematic diagram of a coupon and a micro-coupon that are extracted from a blank.
Figure 2:
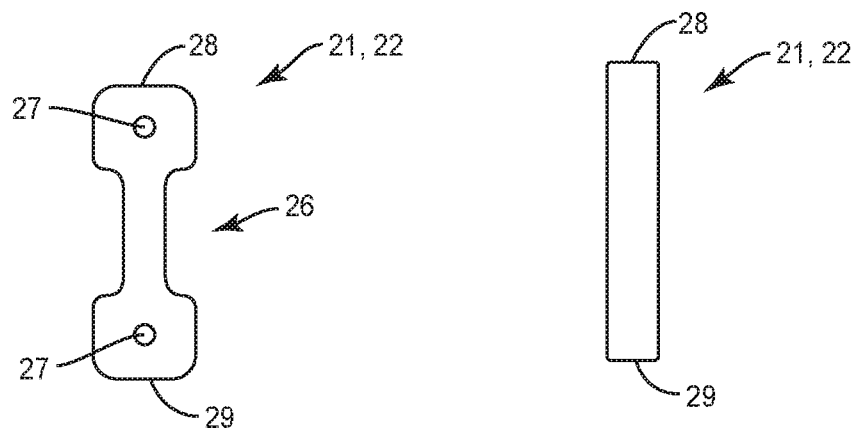
FIG. 2 is a front view of a coupon or a micro-coupon.
Figure 3:
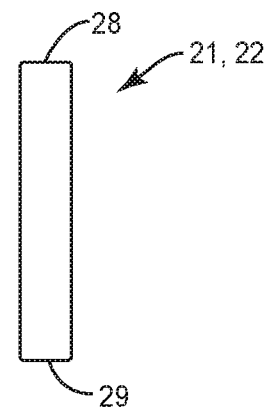
FIG. 3 is a side view of a coupon or a micro-coupon.

The test methods disclosed herein use test specimens extracted from a material blank 20. The material blank 20 is constructed using a predetermined additive manufacturing process. FIG. 1 illustrates a blank 20 constructed using an additive manufacturing process. One or more test specimens are extracted from the blank 20 to test the additive manufactured (AM) material. The test specimens include a standard size test specimen 21 and a smaller size test specimen 22. The test specimens 21, 22 can include a variety of shapes. FIG. 2 illustrates a test specimen 21, 22 that includes an elongated shape with a first end 28 and a second end 29. A central section 26 is located between the first and second ends 28, 29 and can be narrower than the ends 28, 29. Openings 27 can be positioned towards each of the ends 28, 29 for attaching to a test fixture. FIG. 3 includes another test specimen 21, 22 with the central section 26 having an equal width relative to the ends 28, 29. The test specimens 21, 22 can be attached to a test fixture using the openings 27 as well as in various other manners.

Figure 4:
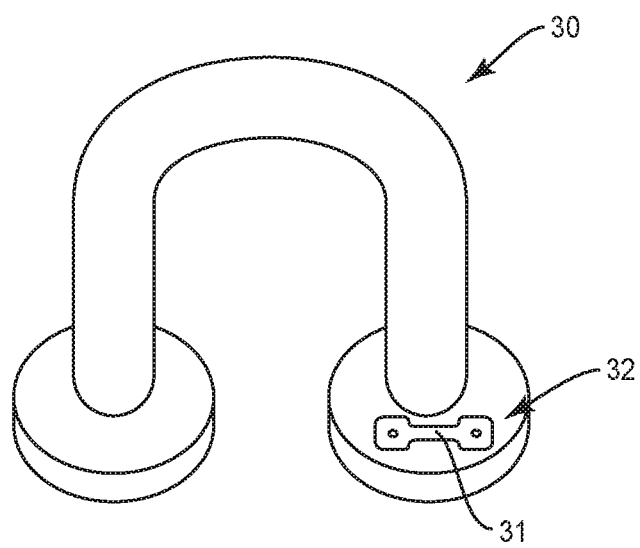
FIG. 4 is a perspective view of an AM part and a part micro-coupon that is extracted from a location within the part.

The test methods disclosed herein also use test specimens extracted from a part 30 manufactured using the same additive manufacturing process. The AM part 30 is constructed using a part design, such as a computer-generated file of the part. FIG. 4 illustrates an AM part 30 constructed from a design of the part using the same AM process as that used to construct the blank 20.

Smaller size test specimens 31 are extracted from the AM part 30. The smaller size test specimens 31 extracted from the AM part 30 and the smaller size test specimens 22 from the blank 20 can include the identical geometric dimensions. The size and geometry of the smaller size test specimens 22, 31 are not standardized so various sizes and geometries can be used. In one design, these test specimens 22, 31 have a gauge length smaller than 0.45 in. The size of these smaller test specimens 22, 31 can also depend on the size of the AM part 30. The test specimens 22, 31 can be small enough for use to extract strength data out of a particular location 32 on the AM part 30. This location 32 could be very small or thin making it impractical to use a larger standard size coupon from an industry standard (such as ASTM E8).

An advantage of the present methodology is the use of the smaller size test specimens 31 from the AM part 30. This provides for the smaller size test specimens 31 to be extracted from one or more specific locations 32 on the AM part 30. These locations 32 can be relatively small, but are large enough to allow for smaller size test specimens 31 to be extracted. Conversely, it would not be possible to extract a larger standard size test specimen from the location 32 because it is larger than the location 32. Using a test specimen from a specific location 32 on the part 30 has been determined to be a more effective manner of determining physical aspects about the AM material and/or the design of part 30.

The one or more locations 32 on the AM part 30 from where the smaller size test specimens 31 are extracted can be those critical in the mechanical performance of the AM part 30. This can include locations 32 that will be exposed to high loads when the AM part 30 is in use. The locations 32 can be constructed of relatively small amounts of AM material relative to the loads to which they will be exposed. The one or more locations 32 can be determined based on an analysis of the corresponding computer generated file of the part 30. The locations 32 can be determined using techniques such as linear and non-linear finite element methods (FEM).

The extraction of the smaller size test specimens 31 from the AM part 30 can initially include extraction of one or more blanks. The smaller size test specimens 31 are then extracted from the one or more blanks. The extraction of material can be performed using various conventional machining techniques. The techniques can be performed with minimal alteration to the material and/or minimal distortion, and produce the smaller size test specimen 31 with the required tolerances. The extraction should also produce one or more smaller sized test specimens 31 with low residual stresses and surface finish. After extraction, dimensional inspection can be performed to verify that the smaller size test specimens 31 are within the specified tolerances.

The standard and smaller size test specimens 21, 22 from the blank 20 and one or more of the smaller size test specimens 31 from the AM part 30 are tested using known mechanical testing techniques. The test results for the smaller size test specimen from the AM part 30 can be referred to as micro-coupon-parts test results. The testing calculates various properties of the AM material, including but not limited to stress and strain properties, and tensile properties such as yield strength, tensile strength, elongation, and Young Modulus.

One method calculates a mechanical capability of the AM material. The method accounts for the use of the smaller size test specimens versus the traditional use of test specimen of larger standard size, extracting the one or more test specimens from a particular location on the AM part 30, and statistically-derived material properties of the AM material.

The method includes calculating a first correction factor that accounts for use of the smaller size test specimens (block 50). In this method, the smaller size test specimens are used instead of the larger standard size test specimens. The first correction factor uses the material properties of smaller size test specimen 22 from the material blank 20 (F-micro-coupon) divided by the material properties of one or more standard size test specimens 21 from the material blank 20 (F-coupon). This calculation is defined in Equation 1:

$$\text{First Correction Factor} = F\text{-micro-coupon}/F\text{-coupon} \quad \text{(Equation 1)}$$

For example, the testing determines the yield strength of the smaller size test specimens 22, 31. A yield strength first correction factor can be calculated from the AM material. In another example, the testing determines the ultimate tensile strength for the smaller size test specimens 22, 31. An ultimate tensile strength first correction factor can then be calculated for the AM material.

The method also determines a second correction factor to account for the smaller size test specimens 31 being from one or more specific locations 32 on the AM part 30 (block 52). The second correction factor is calculated as the test results of the smaller size test specimen 31 from the AM part 30 (F-part micro-coupon) divided by the test results of the smaller size test specimen 22 from the material blank 20 (F-micro-coupon). This second correction factor is defined in Equation 2:

$$\text{Second Correction Factor} = F\text{-part micro-coupon}/F\text{-micro-coupon} \quad \text{(Equation 2)}$$

For example, the testing determines the yield strength and tensile strength of the smaller size test specimens 22, 31. A yield strength second correction factor and a tensile strength second correction factor can be calculated for the AM material.

The method calculates a statistically-derived material property of the AM material (block 54). The one or more standard size test specimens 21 from the blank 20 are tested to determine the statistically-derived material property of the AM material (e.g., yield strength, tensile strength). This statistically-derived material property (referred to as F-coupon-allowable) can be calculated using various well-known industry methods, such as the methods established in CMH-17 (Composite Material Handbook) and Metallic Materials Properties Development and Standardization (MMPDS).

The method calculates a capability value of the AM material (block 56) at the selected location 32. This capability value is the capability of the AM material, such as the inherent strength of the AM material. The capability value is calculated by multiplying the statistically-derived material property (F-coupon-allowable) by each of the first and second correction factors. The capability value of the AM material at the selected location 32 is defined in Equation 3:

$$\text{Capability value} = F\text{-coupon-allowable} \times 1^{st} \ Cor. \ \text{Fact.} \times 2^{nd} \ Cor. \ \text{Fact.} \quad \text{(Equation 3)}$$

One example includes determining tensile strengths of the test specimens and calculating statistically-derived tensile strength values. The overall tensile strength value of the AM material at the location 32 is then calculated as the statistically-derived tensile strength values adjusted by applying each of the tensile strength correction factors. It is understood that the capability value of different material characteristics of the AM material can be calculated in a similar manner.

Figure 5:
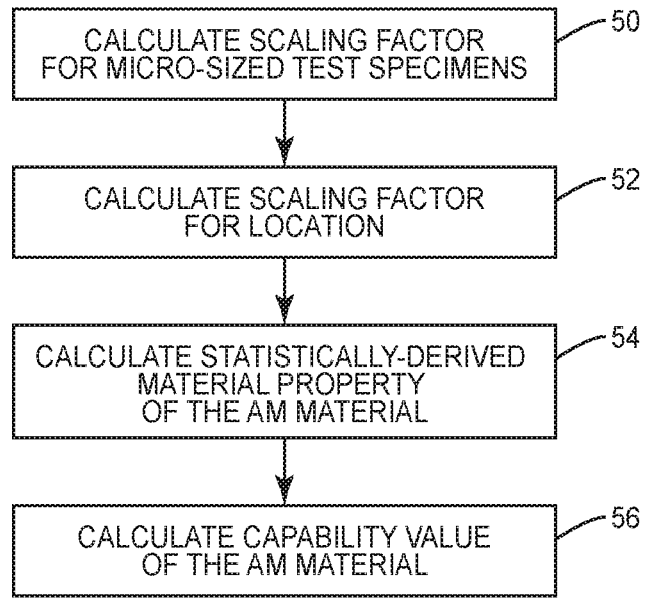
FIG. 5 is a flowchart diagram that illustrates a method of calculating a material property of AM material.
Figure 6:
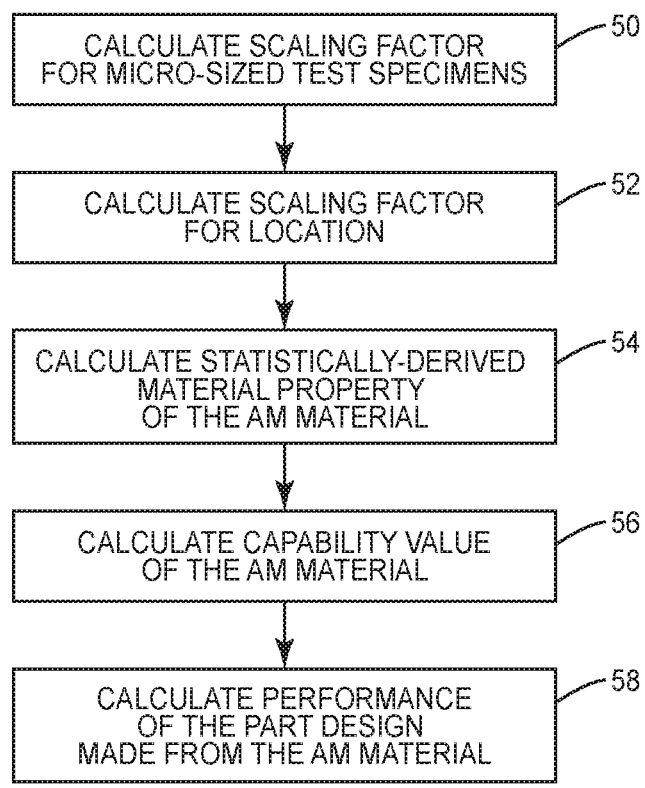
FIG. 6 is a flowchart diagram that illustrates a method of analyzing the design of an AM part.

The capability value of the AM material can be used to determine additional aspects about the part design. One aspect is to analyze the part design to calculate a predicted performance of an AM part that would be made using the same process using the same AM material. The analysis calculates the expected performance of the part design at the location 32. FIG. 6 illustrates a method of analyzing the part design using the capability value calculated using the method of FIG. 5. As illustrated in FIG. 6, steps 50-56 are the same as those disclosed in the method of FIG. 5. The method of FIG. 6 includes an additional step of using the capability value of the AM material to further analyze the design of the part using the AM material. The method calculates a predicted performance of the part design at the location if it were to be made from the AM material (block 58).

In one method, the analysis uses the computer generated model of the part. A computerized modeling tool uses the computer generated model of the part design to simulate how the part will be loaded in service (e.g., 500 pounds of tensile load). The method can include finite element analysis (FEA) to predict how a part that would be made using the additive material will respond or be stressed at the location 32 during service loading. In one design, the calculated response at the location 32 provides a prediction of the performance of the overall part design.

Figure 7:
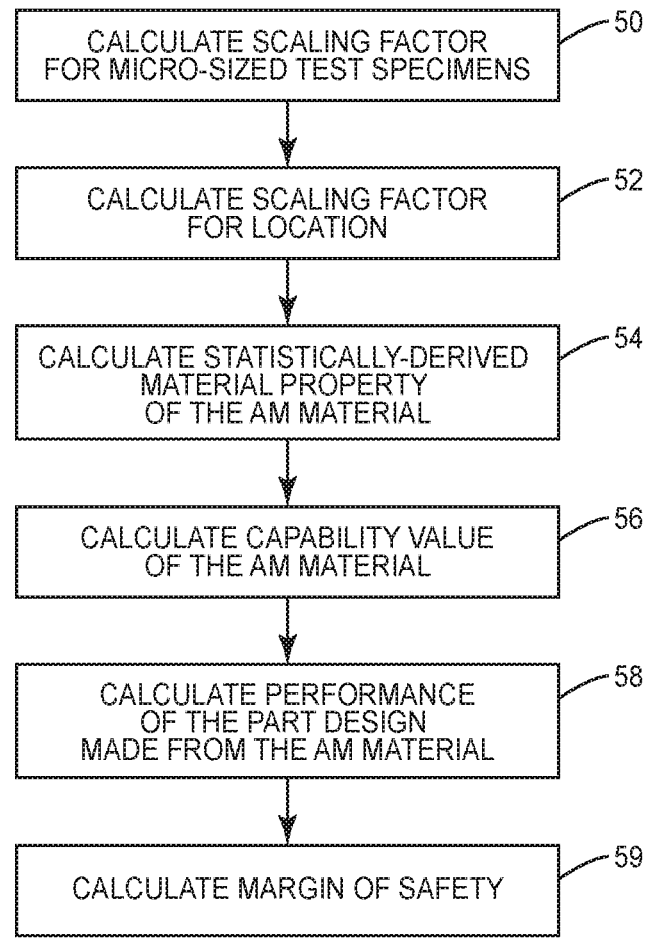
FIG. 7 is a flowchart diagram that illustrates a method of calculating a margin of safety of an AM part.

These methods can be further leveraged to calculate a margin of safety of the part design. As illustrated in FIG. 7, the method includes the same steps 50-58 as disclosed in the method of FIG. 6. The method also calculates the margin of safety (block 59). The margin of safety is the quantity that describes how much stronger a part made from the AM material using the part design is, than is required for particular loads before it fails at the location 32. The margin of safety uses the capability value of the AM material at the location 32 and the predicted performance of the part design that uses the AM material at the location 32. The computer generated model analysis may be used to calculate the margin of safety. For example, if the analysis predicts the location 32 will experience a maximum response of 60,000 pounds per square-inch and the calculated overall performance of the part design using the AM material at the location 32 is 70,000 pounds per square-inch, the margin of safety is 0.17 (calculated by 70,000/60,000−1).

Figure 8:
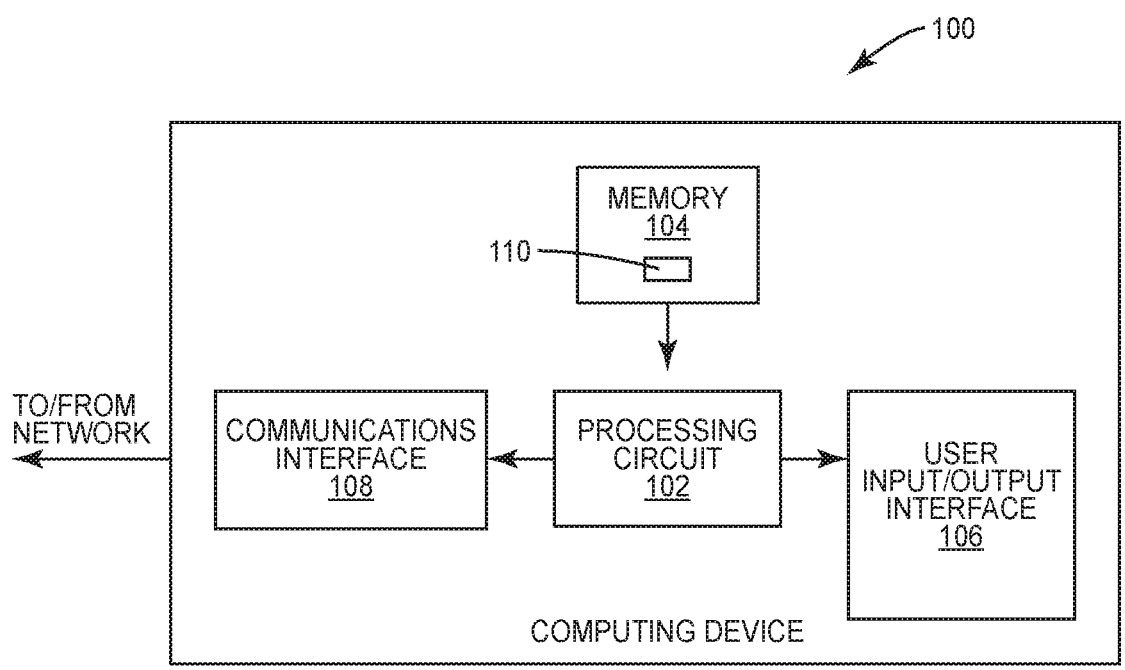
FIG. 8 is a block diagram that illustrates a computing device

FIG. 8 is a block diagram illustrating a computing device 100 configured to determine one or more of the aspects of the part design. As seen in FIG. 8, computing device 100 comprises processing circuitry 102 communicatively coupled via one or more buses to a memory 104, a user input/output interface 106, and a communications interface 108. According to various aspects of the present disclosure, processing circuitry 102 comprises one or more microprocessors, microcontrollers, hardware circuitry, discrete logic circuits, hardware registers, digital signal processors (DSPs), field-programmable gate arrays (FPGAs), application-specific integrated circuits (ASICs), or a combination thereof. In one such aspect, the processing circuitry 102 includes programmable hardware capable of executing software instructions stored, e.g., as a machine-readable computer control program 110 in memory 104. These instructions can include various FEA and other analysis methods using computer-generated models of the part design. More particularly, processing circuitry 102 is configured to execute control program 110 to perform the aspects of the disclosure previously described.

Memory 104 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 8, memory 104 is configured to store a computer program product (e.g., the control program 110) executed by processing circuitry 102 to perform the aspects of the present disclosure. Memory 104 can also store a computer generated model of the part design that is used to calculate one or more of the aspects, and one or more computerized modeling tools.

The user input/output interface 106 comprises circuitry configured to control the input and output (I/O) data paths of the computing device 100. The I/O data paths include data paths for exchanging signals with other computers and mass storage devices over a communications network (not shown), and/or data paths for exchanging signals with a user. In some aspects, the user I/O interface 106 comprises various user input/output devices including, but not limited to, one or more display devices, a keyboard or keypad, a mouse, and the like.

The communications interface 108 comprises circuitry configured to allow the computing device 100 to communicate data and information with one or more remotely located computing devices. Generally, communications interface 108 comprises an ETHERNET card or other circuit specially configured to allow computing device 100 to communicate data and information over a computer network. However, in other aspects of the present disclosure, communications interface 108 includes a transceiver configured to send and receive communication signals to and from another device via a wireless network.

The various testing methods can include one or more test specimens 21, 22, 31 for use in the various steps. Further, the number of tests performed on the test specimens 21, 22, 31 can vary.

Various types of additive manufacturing processes can be used. One type includes powder bed AM. Other types of additive manufacturing includes but is not limited to laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), 3D printing, rapid prototyping, direct digital manufacturing, layered manufacturing, and additive fabrication.

The part design using AM material can be used for making parts for a wide variety of uses. One context is for use on a variety of vehicles. Vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of analyzing a part design, the method comprising:

extracting one or more coupons and micro-coupons from one or more blanks of additive manufactured material made by an additive manufacturing process, the coupons being larger than the micro-coupons;

testing the one or more coupons and micro-coupons from the one or more blanks and calculating a first correction factor based on a ratio of test results of the one or more micro-coupons from the one or more blanks relative to test results of the one or more coupons from the one or more blanks;

using the additive manufacturing process and making a part from the additive manufactured material according to the part design;

extracting one or more micro-coupons from the part;

testing the one or more micro-coupons from the part and calculating a second correction factor based on a ratio of test results of the one or more micro-coupons from the part relative to the test results of the one or more micro-coupons from the one or more blanks;

calculating a statistically-derived material property of the additive manufactured material by testing the one or more coupons from the one or more blanks; and calculating a capability value of the additive manufactured material by applying the first correction factor and the second correction factor to the statistically-derived material property of the additive manufactured material.

2. The method of claim 1, further comprising using the capability value and calculating a performance of parts to be made according to the part design from the additive manufactured material.

3. The method of claim 1, wherein calculating the first correction factor comprises dividing the test results of the one or more micro-coupons from the one or more blanks by the test results of the one or more coupons from the one or more blanks.

4. The method of claim 3, wherein calculating the second correction factor comprises dividing the test results of the one or more micro-coupons from the part by the test results of the one or more micro-coupons from the one or more blanks.

5. The method of claim 1, wherein calculating the capability value of the additive manufactured material comprises multiplying the statistically-derived material property of the additive manufactured material by the first correction factor and the second correction factor.

6. The method of claim 1, wherein extracting the one or more micro-coupons from the part comprises excising a blank from the part and extracting the one or more micro-coupons from the blank.

7. The method of claim 1, wherein the one or more micro-coupons from the one or more blanks and the one or more micro-coupons from the part include identical geometric dimensions.

8. A method of analyzing a part design, the method comprising:

extracting one or more coupons and micro-coupons from one or more coupon blanks made from an additive manufactured material by an additive manufacturing process;

extracting one or more micro-coupon-parts from an additive manufactured part made by the additive manufacturing process using the part design;

testing a material property and obtaining test results for each of the one or more coupons, the micro-coupons, and the micro-coupon-parts;

calculating a first correction factor based on the test results of the one or more micro-coupons relative to the test results of the one or more coupons;

calculating a statistically-derived material property of the additive manufactured material based on the test results of the one or more coupons;

calculating a second correction factor based on the test results of the one or more micro-coupon-parts relative to the test results of the one or more micro-coupons;

calculating a capability value of the additive manufactured material based on the first correction factor and the second correction factor applied to the statistically-derived material property; and using the capability value and calculating a performance of parts to be made according to the part design from the additive manufactured material.

9. The method of claim 8, further comprising the one or more coupons being larger than both of the one or more micro-coupons and the one or more micro-coupon-parts.

10. The method of claim 9, wherein the one or more micro-coupons and the one or more micro-coupon-parts include identical geometric dimensions.

11. The method of claim 8, further comprising calculating a margin of safety of parts to be made according to the part design from the additive manufactured material, the margin of safety being calculated based on the capability value of the additive manufactured material.

12. The method of claim 8, wherein calculating the performance of parts to be made according to the part design from the additive manufactured material comprises analyzing a computer model of the part design with loading conditions using the capability value of the additive manufactured material.

13. The method of claim 8, wherein calculating the first correction factor comprises dividing the test results of the one or more micro-coupons by the test results of the one or more coupons.

14. The method of claim 8, wherein calculating the second correction factor comprises dividing the test results of the one or more micro-coupon-parts by the test results of the one or more micro-coupons.

15. The method of claim 8, wherein calculating the capability value of the additive manufactured material comprises multiplying the statistically-derived material property by the first correction factor and the second correction factor.

16. The method of claim 8, further comprising extracting the one or more micro-coupon-parts from a selected location on the additive manufactured part.

17. The method of claim 16, wherein extracting the one or more micro-coupon-parts from the additive manufactured part comprises:

excising a blank from the additive manufactured part; and extracting the one or more micro-coupon-parts from the blank.

18. A method of analyzing a part design, the method comprising:

extracting one or more micro-coupons and coupons from a blank, with the blank manufactured through an additive manufacturing process that uses an additive manufactured material and with the one or more coupons being larger than the one or more micro-coupons;

testing the one or more micro-coupons and the one or more coupons and obtaining micro-coupon test results and coupon test results, respectively;

calculating a first correction factor by dividing the micro-coupon test results by the coupon test results;

calculating a statistically-derived material property based on the coupon test results;

creating a part that is made using the additive manufacturing process using the additive manufactured material according to the part design;

extracting one or more micro-coupon-parts from the part;

testing the one or more micro-coupon-parts and obtaining micro-coupon-parts test results;

calculating a second correction factor by dividing the micro-coupon-parts test results by the micro-coupon test results;

calculating a capability value of the part by multiplying the first correction factor and the second correction factor by the statistically-derived material property; and calculating a performance of modeled parts to be made using the additive manufacturing process using the additive manufactured material.

19. The method of claim 18, wherein the one or more coupons are larger than both the one or more micro-coupons and the one or more micro-coupon-parts.

20. The method of claim 19, wherein the one or more micro-coupons and the one or more micro-coupon-parts include identical geometric dimensions.

* * * * *